United States Patent [19]

Collier

[11] 4,249,749
[45] Feb. 10, 1981

[54] MOBILE LIFT CART

[76] Inventor: Leroy Collier, 925 NE. 25th St., Belle Glade, Fla. 33430

[21] Appl. No.: 16,150

[22] Filed: Mar. 1, 1979

[51] Int. Cl.³ .............................................. B62B 3/00
[52] U.S. Cl. ..................................... 280/35; 108/145; 280/79.1 A
[58] Field of Search .................... 280/35, 47.34, 47.41, 280/79.1 A; 108/145

[56] References Cited

U.S. PATENT DOCUMENTS

| | | | |
|---|---|---|---|
| 2,805,905 | 9/1957 | Levitan et al. | 108/145 |
| 2,977,168 | 3/1961 | Johnson | 108/145 X |
| 3,245,366 | 4/1966 | Fox | 108/145 |

Primary Examiner—John J. Love
Assistant Examiner—Michael Mar
Attorney, Agent, or Firm—Malin & Haley

[57] ABSTRACT

A scissors type mobile tool cart for supporting a tool box on a platform that can be raised or lowered to various heights. The tool cart has a safety locking mechanism which prevents collapse of the cart and which must be manually operated to change the height of the platform which is supporting the tool box.

3 Claims, 6 Drawing Figures

MOBILE LIFT CART

BACKGROUND OF THE INVENTION

This invention relates to a new and improved cart, and more particularly to a compact mobile cart with a platform supported on a pair of scissor systems vertically adjustable for positioning a load at different heights to eliminate stooping.

In maintenance and stock work, for example, it is often necessary to move tool boxes or supplies from one location to another location. In the past, carts used in moving maintenance tools or small stock have either been of the four wheel type having a fixed platform approximately waist high, or of the two wheel tiltable dolly type, having a platform near ground level. The four wheel type is difficult to move in confined spaces or over hoses or up stairs and requires much wasted movement to obtain tools or stock when working below the fixed height of the load carrying platform. The two wheel dolly type, although more maneuverable, requires constant stooping to obtain tools or stock.

SUMMARY OF THE INVENTION

The present invention relates to a new and improved mobile lift cart with an adjustable support platform. The support platform for tools or stock can be raised and lowered to different heights and provides fast and convenient use of materials thereupon. The platform is held in position on a scissor system by a locking mechanism which must be manually released prior to lowering the height of the platform. Expansion springs connected between the scissor system assist in raising a heavy load.

The cart is supported on two wheels positioned near the rear of the cart and fixed supports near the front of the cart. The cart also has a handle which allows it to be pivoted off of the fixed supports for movement on the two wheels.

It is the primary object of this invention to provide a lift cart with an adjustable support platform which is non-complex in construction, yet is sturdy and safe.

It is another object of this invention to provide a lift cart which is easily maneuverable in small spaces.

It is still another object of this invention to provide a lift cart which is free from hydraulic lifting cylinders and provides mechanical locks to secure the movable platform into position.

It is yet another object of this invention to provide a lift cart which requires positive operator action to raise and lower the support platform.

It is a further object of this invention to provide a lift cart with a scissors system for safely adjusting the height of the platform.

It is still a further object of this invention to provide a lift cart with a scissors system having a biasing means to assist in raising a heavy load.

In accordance with these and other objects which will be apparent hereinafter, the instant invention will now be described with particular reference to the accompanying drawings.

DESCRIPTION OF THE PREFERRED EMBODIMENT

Figure 1:
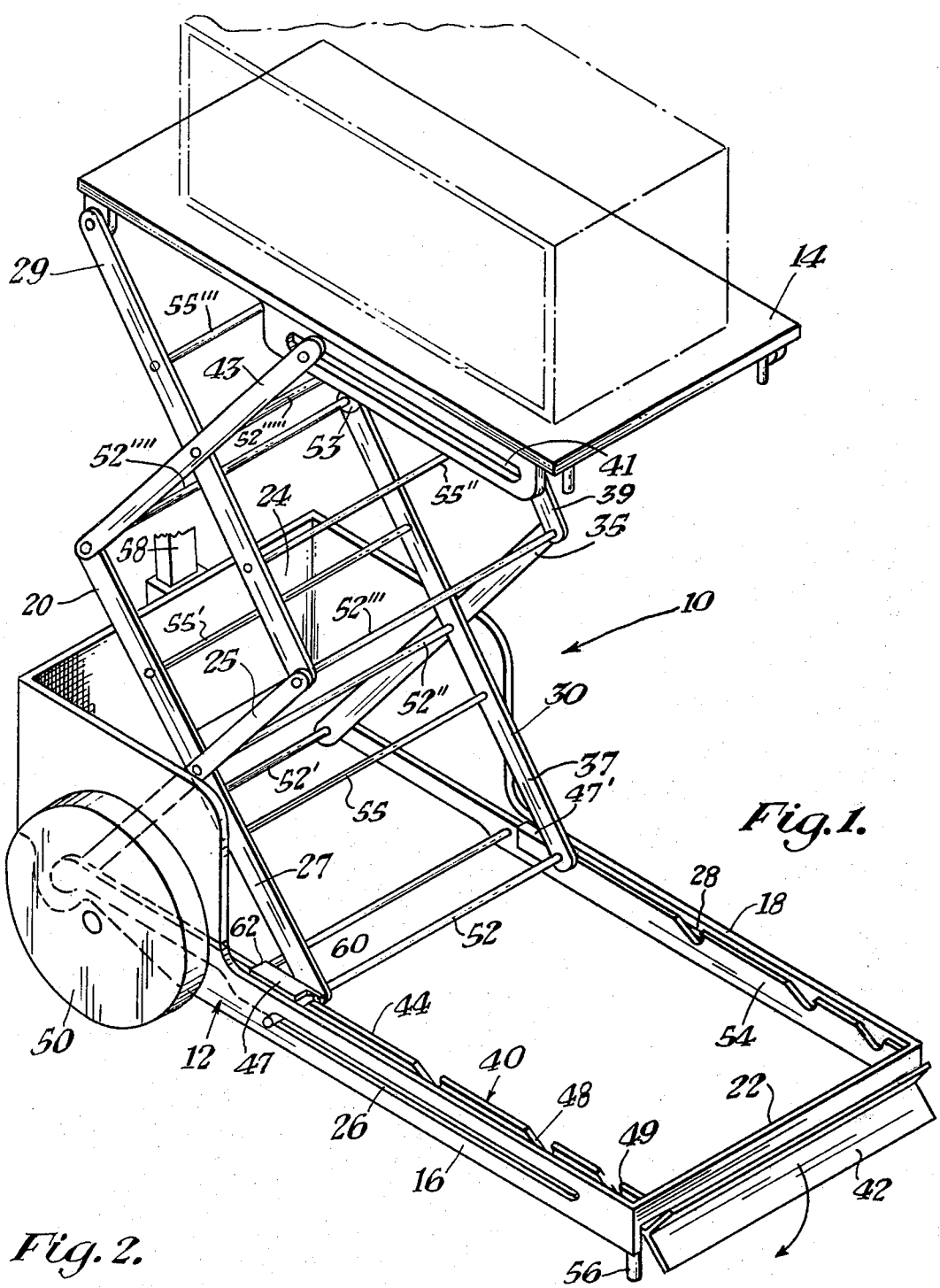
FIG. 1 is a perspective view of the present invention in an extended position.
Figure 2:
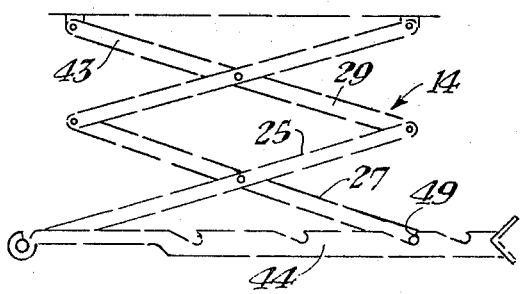
FIG. 2 is a partial side elevational view of FIG. 1.
Figure 3:
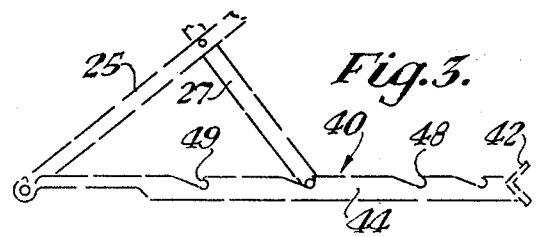
FIG. 3 is a fragmentary view of FIG. 2 illustrating the safety locking mechanism.

Referring now in detail to the drawings and in particular to FIG. 1, there is shown a perspective view of the mobile lift cart, generally designated as numeral 10, in an extended vertical position. The cart 10, made of mild steel for example, comprises a generally rectangular support platform 14 supported from a base 12 by scissors connectors 20 and 30. The base 12 is of a shape corresponding to that of the support platform 14 and generally parallel to the support platform 14.

The base 12 includes side members 16 and 18 laterally connected by front member 22 and rear member 24. The side members 16 and 18 are disposed edgewise from the base 12 with longitudinal slots 26 and 28 therein respectively. The scissors connectors 20 and 30 are pivotally connected by lower arms 25 and 35 to the side members 16 and 18, and slideably connected by arms 27 and 37 in the slots 26 and 28 respectively. The scissors connectors 20 and 30 are laterally supported at their pivot points by connecting bars 52, 52', 52'', 52''', 52'''', and 52''''', which prevent movement of the scissors connectors in a sideways direction. The inside arms 27 and 37, and 29 and 39 are also connected by brace members 55, 55', 55'', and 55''' to prevent side sway. The support platform 14 is pivotally connected to upper scissor arms 29 and 39 and further connected by way of longitudinal slots 41 and 51 to outside upper arms 43 and 53.

The base 12 also has a safety locking mechanism 40 pivotally connected to the side member 16 and 18. The safety locking mechanism 40 includes longitudinal side members 44 and 54 generally parallel to base side members 16 and 18, and a transverse connecting member 42. The safety locking mechanism 40 is held in a position generally parallel to the base 12 by spring 46.

Each locking mechanism side member 44 and 54 has lock notches 48 for engaging scissor connecting bar 52, thereby maintaining support platform 14 at a particular height relative to the base 12. Connected adjacent lower arms 27 and 37 to connecting bar 52 are guide members 47 and 47'. The guide members 47 and 47' have a top portion and a side portion forming a right angle which bear upon locking side members 44 and 54. The guide members 47 and 47' are pivotally connected to connecting bar 52 such that as connecting bar 52 is moved from engagement with locking notches 48, the proximal end 60 disengages from the side members 44 and 54, while the distal end 62 remains in engagement with the side members. Thus, when the connecting bar 52 is again directed toward engagement with the lock notches 48, there will be a smooth engagement, since the lower arms 27 and 37 are prevented from moving sideways by the continuous engagement of the side members 44 and 54 with the distal end 62 of the guide members 47 and 47'.

The lift cart 10 is supported by a pair of wheels 50 and a pair of stationary supports or props 56. A detachable handle 58 is also connected to the cart 10, thereby allowing the cart 10 to be easily maneuvered over objects or up and down stairs.

Figure 4:
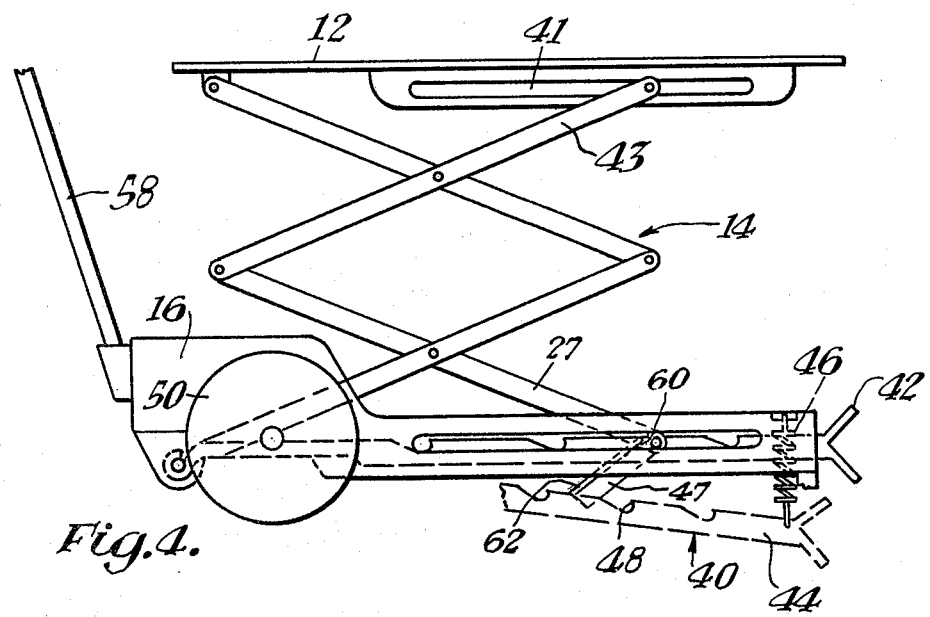
FIG. 4 is a side elevational view of FIG. 1 illustrating the safety locking mechanism in an unlocked position in phantom.
Figure 5:
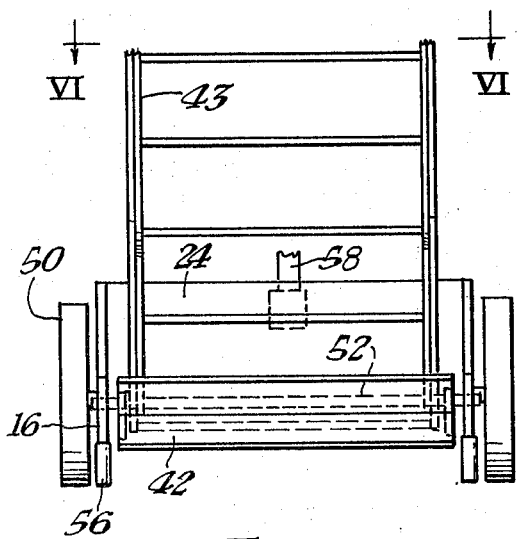
FIG. 5 is a front elevational view of FIG. 1.

In normal operation, a load placed upon the support platform 14 cannot be lowered until the support platform 14 is raised to allow the scissor connecting bar 52 to slide rearward in the lock notches 48. After the scissor connecting bar 52 is released from the lock notches 48, the safety locking mechanism 40 is pivoted downward by stepping on the foot pedal 42 which extends the full width of the cart to prevent foot injury, thereby allowing the support platform 14 to be lowered to a new position. When the safety locking mechanism 40 is in the lowered position as illustrated in FIG. 4, the distal end 62 of the guide member 47 remains engaged with side members 44 and 54 to prevent sideway movement of the lower arms 27 and 37 over the side members 44 and 54. Once the support platform is at a new position, the foot pedal 42 is released and is brought back into engagement with the scissor connecting bar 50 by a biasing means such as spring 46. The connecting bar 52 moves into lock notches 48 and is prevented from inadvertently moving out of the lock notches 48 by the rearwardly extending tip portion 49.

Figure 6:
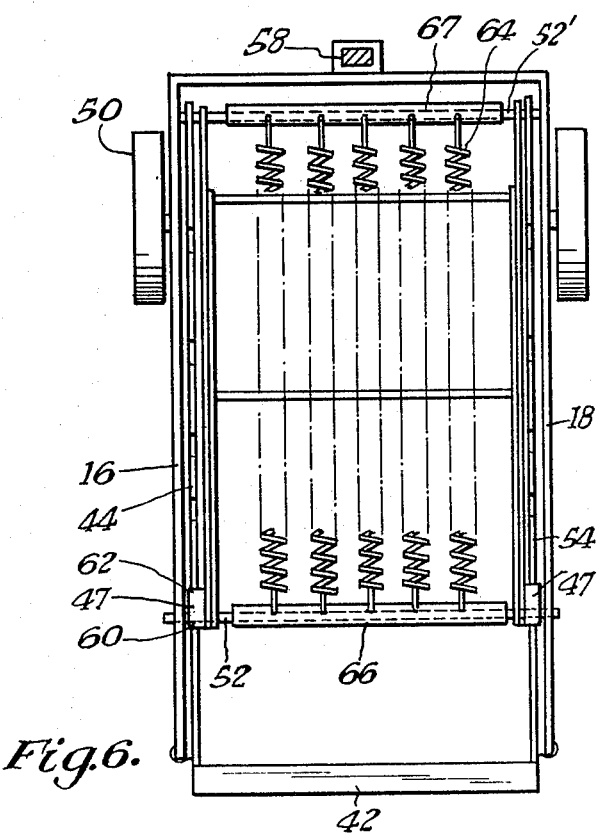
FIG. 6 is a cross-sectional view of FIG. 5 taken along the line VI—VI.

FIG. 6 illustrates springs 64 which are connected to connecting bar 52 and 52' by sleeves 66 and 67 to assist in raising the platform 14 to a new position after connecting bar 52 is released from lock notches 48.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An extendable mobile tool lift apparatus, comprising:

a base frame including wheel means for moving said apparatus over a surface, a support means for stabilizing said apparatus when in a stationary position, and a handle means for pivoting said apparatus off of said support means for movement on said wheel means;

two scissors-type linkage members mounted one on opposite sides of said base frame, a first lower end of each linkage member being pivotally connected to a fixed point on said base frame, a second lower end being constrained to slide in a guideway in said base frame;

bracing means connected between said linkage members for lateral support of said scissors-type linkage members;

a generally flat support means for bearing a load mounted on the upper end of said scissors-type linkage members generally parallel to said base means and extendable vertically above said base means by said scissors-type linkage members;

said scissors-type linkage members having a first upper end pivotally connected to a fixed point on said support means and a second upper end slidable in a guideway in said support means;

a foot releasable lower locking means pivotally connected to said base frame for holding said second lower end at a releasable position along said guideway in said base frame to vary the height of said support means, said foot releasable lower locking means attaching said locking means at a proximal end to said base frame, a plurality of engaging means for releasably holding said second lower end of said scissors-type linkage members along said guideway in said base frame, and a spring biasing means connected for biasing said locking means into engagement with said base frame; and a guide means for guiding said second lower end of said scissors-type linkage members into engagement with said engaging means, said guide means slidably connected to said engaging means.

2. An extendable mobile tool lift apparatus as set forth in claim 1 wherein said base frame is mounted on a pair of wheels for movement.

3. An extendable mobile tool lift apparatus as set forth in claim 1 wherein each of said scissors-type linkage members have an identical expansion height.

* * * * *